United States Patent [19]
Bochory

[11] 3,749,133
[45] July 31, 1973

[54] STRAIN ENERGY ERECTILE TUBULAR BEAM WITH STITCHED FLANGES

[75] Inventor: Michael Bochory, Los Angeles, Calif.

[73] Assignee: TrW Inc. Redondo Beach, Calif.

[22] Filed: Apr. 2, 1971

[21] Appl. No.: 130,574

[52] U.S. Cl..................... 138/119, 52/108, 138/170
[51] Int. Cl............................................ F16l 11/14
[58] Field of Search................... 138/151, 170, 119, 138/118; 52/108

[56] References Cited
UNITED STATES PATENTS

| | | | |
|---|---|---|---|
| 3,295,556 | 1/1967 | Gertsma............................. | 138/119 |
| 3,434,254 | 3/1969 | Rubin ................................ | 52/108 |
| 3,032,151 | 5/1962 | Allen ................................. | 52/108 |
| 3,473,758 | 10/1969 | Webb................................. | 52/108 X |
| 2,191,374 | 2/1940 | Dixon ............................... | 138/119 |
| 3,581,778 | 6/1971 | Korejwa............................ | 138/119 |
| 2,742,388 | 4/1956 | Russell............................. | 138/156 X |
| 2,422,725 | 6/1947 | Gilfillan............................ | 138/151 |

Primary Examiner—Herbert F. Ross
Attorney—Daniel T. Anderson, Donald R. Nyhagen and Jerry A. Dinardo

[57] ABSTRACT

A tubular structural member or beam which may be flattened and folded and springs back to its original expanded shape under the force of elastic strain energy when released. The beam is composed of two mirror image half sections constructed of relatively thin resiliently flexible sheet material and having confronting arcuate wall portions forming a tube and contacting outwardly directed flanges along the longitudinal edges of the wall portions pivotally joined to one another by rows of stitching which permit the flanges to rotate away from one another and thereby reduce or eliminate binding stress and resultant creep along the junctures between the flanges and arcuate wall portions when the beam is flattened, whereby the beam may be retained in the folded configuration for a prolonged period of time without adversily effecting its ability to spring back to its original expanded shape.

1 Claim, 3 Drawing Figures

Patented July 31, 1973                                              3,749,133

Michael E. Bochory
*INVENTOR.*

BY
*Donald R. Nyhagen*

ATTORNEY

STRAIN ENERGY ERECTILE TUBULAR BEAM WITH STITCHED FLANGES

BACKGROUND OF THE INVENTION

1. Field of the Invention

This invention relates generally to structural members of the kind which are adapted to be assembled with other similar members to form a frame structure or the like. The invention relates more particularly to a tubular structural member of this kind which may be flattened or folded and springs back to its original shape when released.

2. Prior Art

Tubular structural members, or beam as they will hereafter be referred to, of the kind to which this invention relates are known in the art. By way of example, beams of this type are disclosed in U.S. Pat. No. 3,434,254. Such beams are constructed of relatively thin, resiliently flexible plastic or metallic sheet material and are characterized by the ability to be flattened and folded to compact configuration wherein the beams store elastic strain energy. When the beams are released, this elastic strain energy effects self-erection or spring return of the beams to their original shape. These beams have many useful applications, such as the deployable spacecraft antenna disclosed in U.S. Pat. No. 3,217,328.

Conventional foldable self-erecting beams of the class described comprise essentially a sleeve or tube with diametrically opposed flanges located in a common plane containing the tube axis. Generally, the beam is composed of two mirror image half sections each including a central arcuate wall portion and outwardly directed flanges along the longitudinal edges of the wall portion. The two half sections are assembled in confronting relation with their concave sides facing one another and their flanges in face to face contact. These contacting flanges are bonded, brazed or otherwise secured to one another in permanent face to face contact.

When such a beam is flattened for folding, its arcuate wall portions are compressed inwardly into generally coplanar relation with the flanges. Because the flanges are bonded in face to face contact, inward deflection of the arcuate wall portions produces substantial bending stress along the junctures of the flanges and wall portions. This bending stress, in turn, causes creep of the beam material which prevents the folded beam from springing back to its original shape, particularly if the beam is retained in its folded configuration for any length of time.

SUMMARY OF THE INVENTION

The present improved foldable self-erecting beam is similar to the conventional beam just described except for the manner of joining the contacting flanges of the beam half sections. According to the present invention, the beam flanges are pivotally joined adjacent and parallel to the junctures of the flanges and arcuate wall portions in such a way that the flanges can rotate away from one another when the wall portions are flattened. This substantially reduces or eliminates bending stress and resultant creep along the junctures and thus conditions the beam when folded to spring back to its original expanded shape upon release. In the preferred embodiment of the invention illustrated in the drawings, the pivotal connection between each pair of contacting flanges is provided by a row of zig-zag stitching.

PREFERRED EMBODIMENTS OF THE INVENTION

Figure 1:
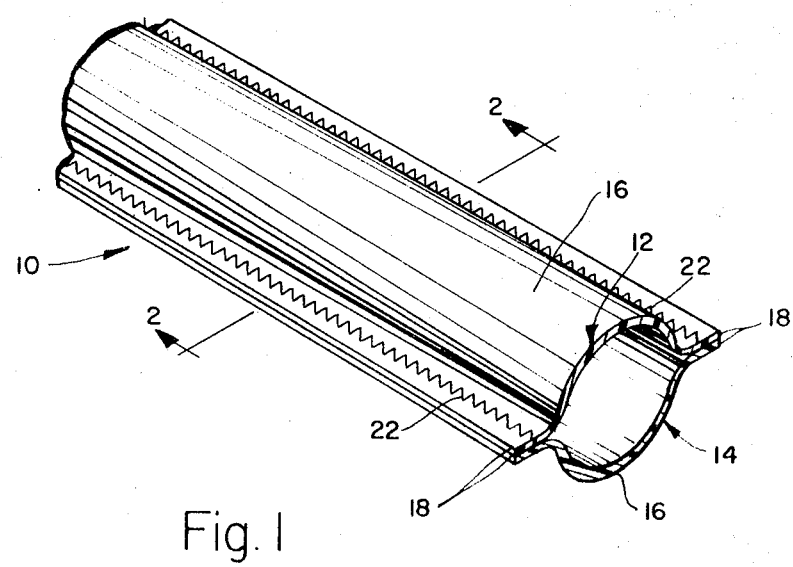
FIG. 1 is a perspective view of a present improved beam.

The illustrated foldable self-erecting beam 10 of the invention comprises a pair of mirror image half sections 12 and 14 constructed of relatively thin and resiliently flexible sheet material which may be a plastic, such as heat treated Mylar or Kapton, or a metal such as beryllium copper. Each beam half section 12, 14 has a central arcuate wall portion 16, which is shown to be generally semicyclindrical in curvature, and outwardly directed flanges 18 along the longitudinal edges of the wall portion. As shown best in FIG. 2, the junctures 20 of the wall portion 16 and flanges 18 conform to a small radius and merge tangentially with the wall portions and flanges. The half sections are assembled with their concave sides facing one another and their flanges on contact.

According to the present invention, the contacting beam flanges 18 are joined adjacent and parallel to the wall-flange junctures 20 by pivotal connections 22 which permit the flanges to rotate toward and away from one another when the beam is flattened and released as explained below. In the preferred beam configuration illustrated, the pivotal connections 22 are provided by rows of zig-zag stitching along and parallel to the junctures 20.

Figure 2:
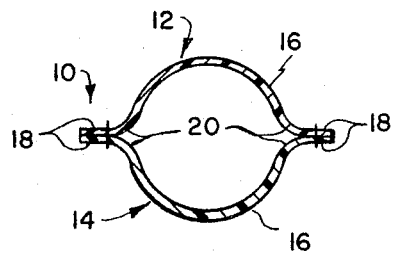
FIG. 2 is a section taken on line 2-2 in FIG. 1.
Figure 3:
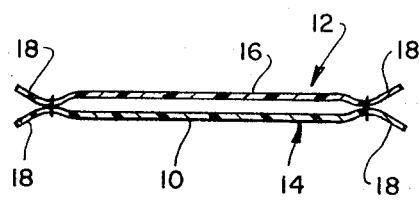
FIG. 3 illustrates the hinging action of the beam flanges to reduce bending stress and creep when the beam is flattened.

The beam half sections 12, 14 are shaped such that in their normal undeformed or expanded configuration of FIGS. 1 and 2, the arcuate wall portions 16 define a sleeve or tube and the beam flanges 18 are disposed in face to face contact. The beam is compressed for folding by pressing the arcuate wall portions inwardly to their positions of FIG. 3, wherein the wall portions are generally flat and disposed substantially in the common plane of the flanges. When compressed and folded, the beam stores elastic strain energy which causes the beam to spring back to its original expanded shape upon release. As shown in FIG. 3, during compression of the beam, the flanges rotate outwardly away from one another about their pivotal connections 22 in such a way that bending deformation and bending stress in the junctures 20 is substantially reduced compared to that which occurs in a conventional beam having flanges which are bonded face to face. This reduction in bending stress, in turn, reduces or eliminates creep of the beam sheet material along the junctures and thereby permits the beam to be retained in folded configuration for a prolonged period of time without adversely effecting its ability to spring back to its original expanded shape when released.

What is claimed as new in support of Letters Patent is:

1. A collapsible and foldable self-erecting tubular structural member comprising:

a relatively thin walled resiliently flexible tube composed of two separate mirror image wall sections each including a central generally semicylindrical wall portion, outwardly directed flanges along the longitudinal edges of said central wall portion, and arcuate juncture portions joining and merging tangentially with said semicylindrical wall portion and said flanges;

said wall sections being disposed in confronting relation with their flanges in contact and their concave sides facing one another;

longitudinal rows of stitching joinging each pair of contacting flanges adjacent and parallel to said juncture portions in such a way as to provide a hinge connection between the contacting flanges;

said tube having a normal tubular configuration wherein said contacting flanges are disposed in face to face contact across substantially their entire width and said central wall portions define a tubular cross-section, and said tube being adapted to be flattened and folded to a folded configuration wherein said wall sections store elastic strain energy for effecting self-erection of said tube to its normal tubular configuration when released; and said stitching constituting the sole attachment between said contacting falnges and permitting the outer flange edges to hinge away from one another and thereby minimize bending stress in said juncture portions when said tube is flattened and return to contact when said tube is released.

* * * * *